(12) United States Patent
Graham

(10) Patent No.: US 8,585,474 B1
(45) Date of Patent: Nov. 19, 2013

(54) FISH CLEANING METHODS

(71) Applicant: Jeffrey C. Graham, Shreveport, LA (US)

(72) Inventor: Jeffrey C. Graham, Shreveport, LA (US)

( * ) Notice: Subject to any disclaimer, the term of this patent is extended or adjusted under 35 U.S.C. 154(b) by 0 days.

(21) Appl. No.: 13/693,123

(22) Filed: Dec. 4, 2012

(51) Int. Cl.
*A22C 25/16* (2006.01)

(52) U.S. Cl.
USPC .......................................... 452/161

(58) Field of Classification Search
USPC ......................................... 452/160, 102–105
See application file for complete search history.

(56) References Cited

U.S. PATENT DOCUMENTS

| | | | |
|---|---|---|---|
| 1,132,417 A | 3/1915 | Alexander | |
| 2,932,849 A | 4/1960 | Missman | |
| 2,506,227 A | 5/1960 | Lindsey | |
| 3,447,200 A | 6/1969 | Madre | |
| 4,127,919 A * | 12/1978 | Buddecke | 452/196 |
| 4,306,336 A | 12/1981 | Kovar | |
| 4,793,027 A * | 12/1988 | Blight | 452/185 |
| 4,794,670 A * | 1/1989 | Savastano, Jr. | 452/149 |
| 4,797,974 A * | 1/1989 | Smith, Jr. | 452/185 |
| 4,920,612 A * | 5/1990 | Moore | 452/161 |
| 5,376,043 A | 12/1994 | Carter | |
| 5,453,042 A * | 9/1995 | Novello | 452/128 |
| 5,522,765 A * | 6/1996 | Dotson et al. | 452/196 |
| 5,529,534 A * | 6/1996 | Adams | 452/135 |
| 6,001,011 A * | 12/1999 | Johnson | 452/65 |
| 6,123,615 A | 9/2000 | Reber | |
| 6,139,417 A | 10/2000 | Finney | |
| 7,677,960 B2 * | 3/2010 | Van Vleet | 452/102 |
| 2007/0270091 A1 * | 11/2007 | Vleet | 452/102 |

* cited by examiner

*Primary Examiner* — Richard Price, Jr.
(74) *Attorney, Agent, or Firm* — R. Keith Harrison

(57) ABSTRACT

Fish cleaning methods include providing a pick having a pick handle, a pick base carried by the pick handle and a plurality of spaced-apart pick tines extending from the pick base; placing a fish on a fish cleaning surface; grasping the pick handle of the pick with a first hand; immobilizing the fish on the fish cleaning surface by impaling the fish with the pick tines of the pick; grasping a fish cleaning knife with a second hand; and cutting a flesh strip from the fish using the fish cleaning knife.

18 Claims, 5 Drawing Sheets

FISH CLEANING METHODS

FIELD

Illustrative embodiments of the disclosure generally relate to cleaning fish. More particularly, illustrative embodiments of the disclosure relate to fish cleaning methods which facilitate expeditious, efficient and precise cleaning of fish without soiling the hands of a user.

BACKGROUND

A conventional method of cleaning a fish includes grasping the fish with one hand and cutting the flesh from the fish while manipulating a knife using the other hand. However, the hands of the user cleaning the fish, as well as the surface on which the cleaning is carried out, have a tendency to become slimy, particularly after multiple fish are successively cleaned. This may render it difficult for the user to immobilize the fish or hold the knife. Moreover, the fish may have a tendency to flop on the fish cleaning surface if it is not properly immobilized on the surface, rendering cleaning of the fish more cumbersome.

Accordingly, fish cleaning methods which facilitate expeditious, efficient and precise cleaning of fish without soiling the hands of a user are desirable.

SUMMARY

Illustrative embodiments or the disclosure are generally directed to fish cleaning methods which facilitate expeditious, efficient and precise cleaning of fish without soiling the hands of a user. An illustrative embodiment of the fish cleaning methods includes providing a pick having a pick handle, a pick base carried by the pick handle and a plurality of spaced-apart pick tines extending from the pick base; placing a fish on a fish cleaning surface; grasping the pick handle of the pick with a first hand; immobilizing the fish on the fish cleaning surface by impaling the fish with the pick tines of the pick; grasping a fish cleaning knife with a second hand; and cutting a flesh strip from the fish using the fish cleaning knife.

BRIEF DESCRIPTION OF THE DRAWINGS

Illustrative embodiments of the fish cleaning methods will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration," Any implementation described herein as "exemplary" or "illustrative" is not necessarily to be construed as preferred or advantageous over other implementations. All of the implementations described below are exemplary implementations provided to enable users skilled in the art to practice the disclosure and are not intended to limit the scope of the claims. Moreover, the illustrative embodiments described herein are not exhaustive and embodiments or implementations other than those which are described herein an which fall within the scope of the appended claims are possible. Furthermore, there is no intention to be bound by any expressed or implied theory presented in the preceding technical field, background, brief summary or the following detailed description.

Figure 8:
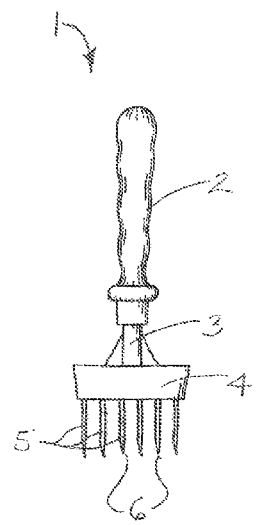
FIG. 8 is a front view of an exemplary pick which is suitable for immobilizing the fish on the fish cleaning surface according to an illustrative embodiment of the fish cleaning method.

Referring initially to FIGS. 1-8 of the drawings, an illustrative embodiment of fish cleaning methods is illustrated. As illustrated in FIG. 8, the methods may utilize a pick 1 to immobilize a fish 20 which is to be cleaned on a fish cleaning surface 10. The fish cleaning surface 10 may be a table, slab or any other surface which is suitable for supporting the fish 20 during cleaning. The pick 1 may include an elongated pick handle 2. A pick shaft 3 may extend from the pick handle 2. A generally elongated pick base 4 may terminate the pick shaft 3. The pick base 4 may have a longitudinal axis which, is disposed in generally perpendicular relationship to the longitudinal axis of the pick handle 2 and the pick shaft 3. Multiple pick tines extend from the pick base 4. The pick tines 5 may be disposed in parallel, adjacent, spaced-apart relationship to each other along the longitudinal axis of the pick base 4. Each pick tine 5 may terminate in a tapered or sharpened tip 6. In some embodiments, 6 pick tines 5 may extend from the pick base 4. In other embodiments, a greater or lesser number of the pick tines 5 may extend from the pick base 4. The pick 1 may be metal, a carbon fiber composite material and/or other hard, durable material which is suitable for the purpose of implementing the fish cleaning method.

Figure 1:
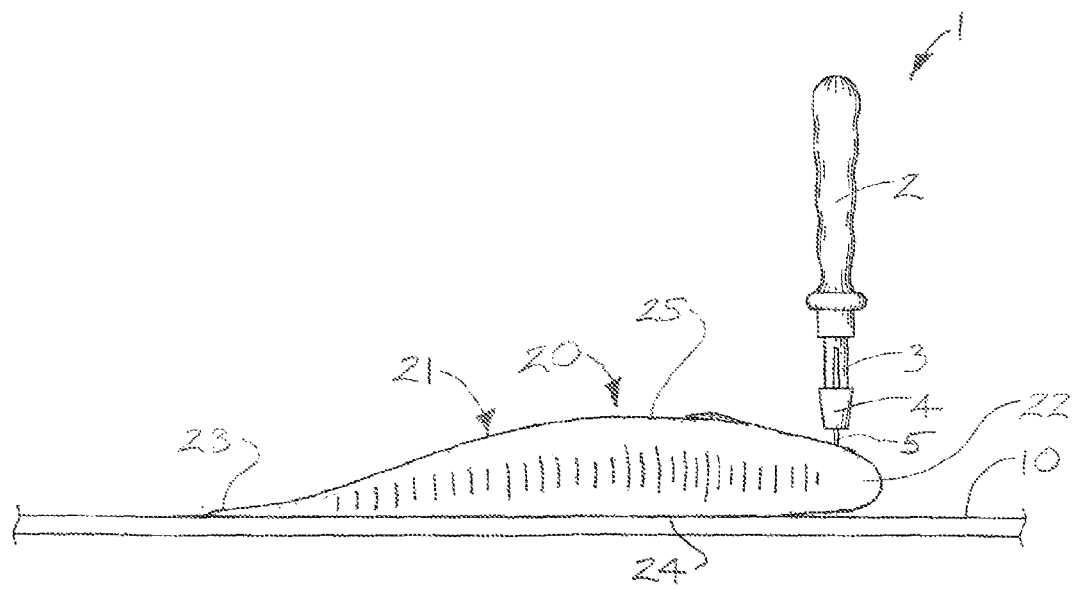
FIG. 1 is a bottom view of a fish lying on a fish cleaning surface, with a pick immobilizing the head of the fish preparatory to cleaning of the fish according to an illustrative embodiment of the fish cleaning methods.

As illustrated in FIG. 1, in implementation of an illustrative embodiment of the fish cleaning methods, a fish 20 which is to be cleaned is initially laid on its left or right side on the fish cleaning surface 10. The fish 20 may be any type of fish which is to be cleaned for eating and/or other purposes. Examples of fish which are suitable for the purpose include but are not limited to catfish, bream and white perch. The fish 20 may have a generally elongated fish body 21, a fish head 22 and a fish tail 23 extending from opposite ends of the fish body 21 and a left side 24 and a right side 25. In the example illustrated in FIG. 1, the fish 20 is initially laid on the fish cleaning surface 10 on its left side 24; however, in other implementations of the method, the fish 20 may initially be laid on the fish cleaning, surface 10 on its right side 25.

The fish 20 is immobilized on the fish cleaning surface 10 using the pick 1. A user (not illustrated) who cleans the fish 20 grips the pick handle 2 using one hand and forces the pick tines 5 of the pick 1 through the fish head 22 and against the fish cleaning surface 10 by applying downward pressure against the pick handle 2. The pick 1 may be positioned such that the longitudinal axis of the pick base 4 is oriented in a perpendicular orientation relative to a longitudinal axis of the fish 20. Accordingly, the pick tines 5 may be spaced along the width of the fish 20. This expedient may enhance the stability of the fish 20 as it is immobilized on the fish cleaning surface 10 during cleaning of the fish 20.

Figure 2:
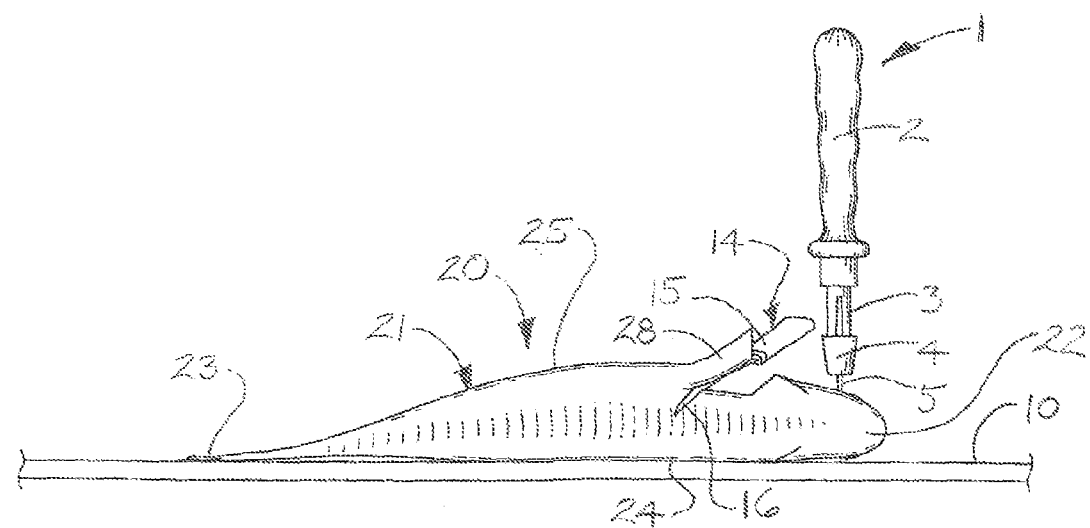
FIG. 2 is a bottom view of the fish as a right side flesh strip is removed from the right side of the fish using a fish cleaning knife.
Figure 3:
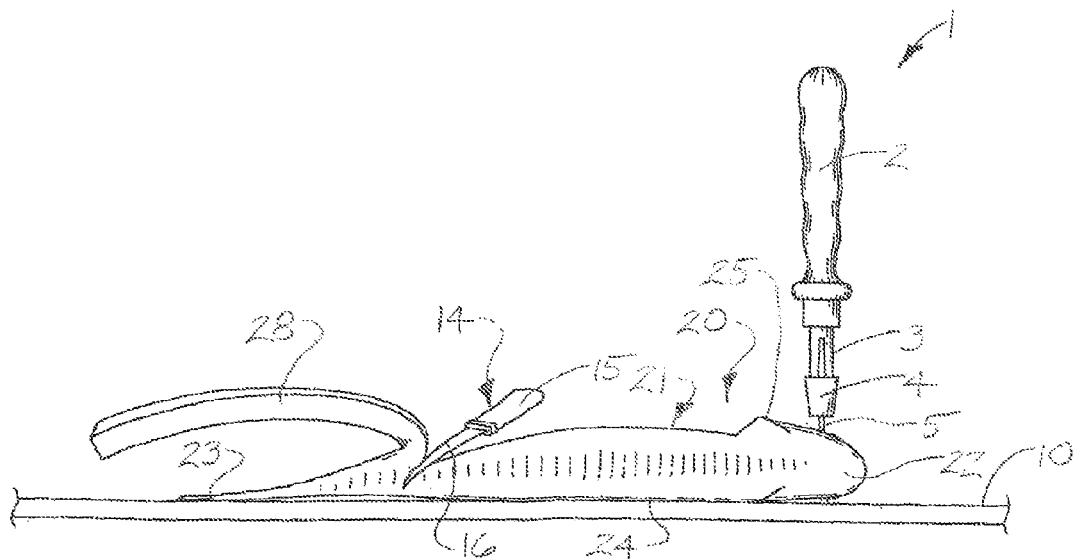
FIG. 3 is a bottom view of the fish, more particularly illustrating, complete removal of the right side flesh strip from the right side of the fish.

As illustrated in FIG. 2, while the user continues to grip the pick handle 2 and maintain downward immobilizing pressure of the pick tines 5 against the head 22 of the fish 20 using one hand, the user grips and uses a fish cleaning knife 14 to cut a right side flesh strip 28 from the fish 20 using the other hand. The fish cleaning knife 14 may be moved away from the fish head 22 toward the fish tail 23 to progressively cut the right side flesh strip 28 from the right side 25 of the fish 20, as illustrated in FIGS. 2 and 3. In some embodiments, the fish cleaning knife 14 may be a manually-operated knife having a conventional design with a knife handle 15 and a knife blade 16 extending from the knife handle 15, as illustrated. In other embodiments, the fish cleaning knife 14 may be an electric filet knife baying a reciprocating blade as is well-known by those skilled in the art.

Figure 4:
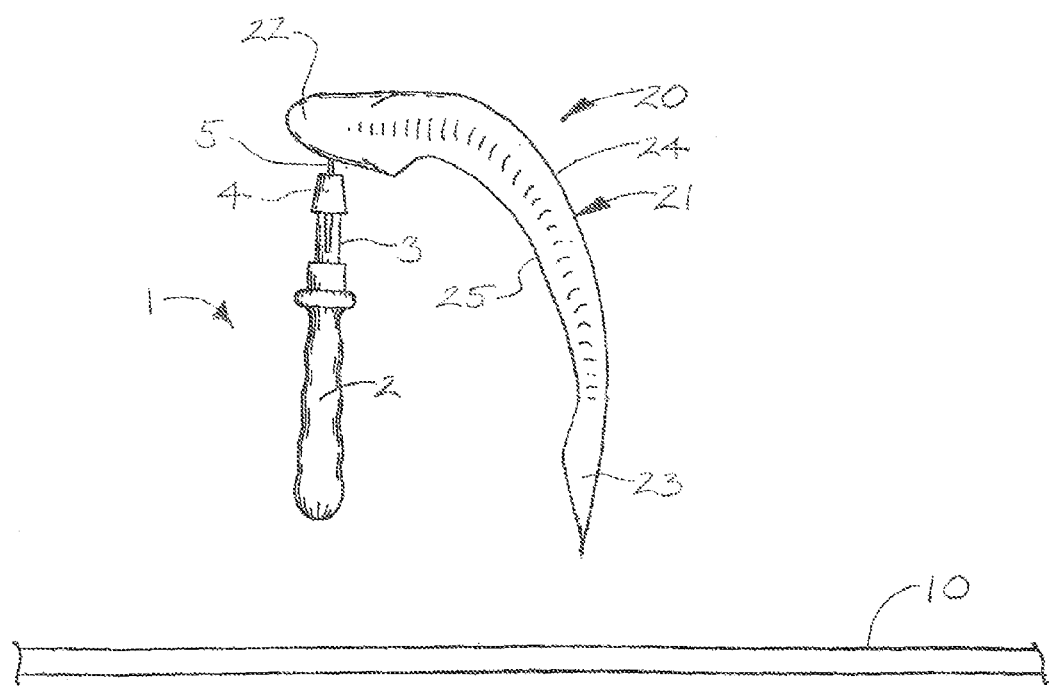
FIG. 4 illustrates flipping of the fish from the left side to the right side preparatory to continued cleaning of the fish.
Figure 5:
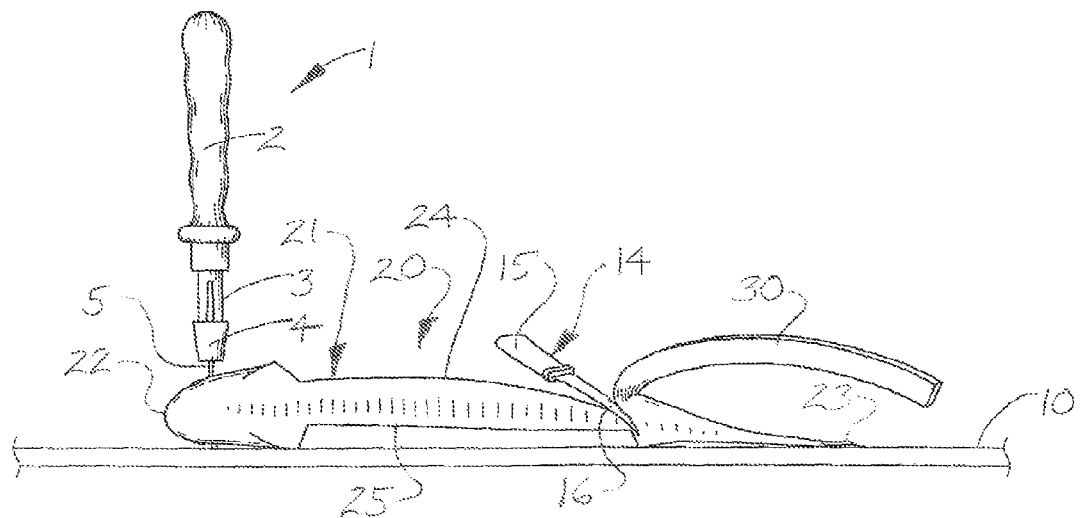
FIG. 5 is a bottom view of the fish, more particularly illustrating complete removal of the left side flesh strip from the left side of the fish.
Figure 6:
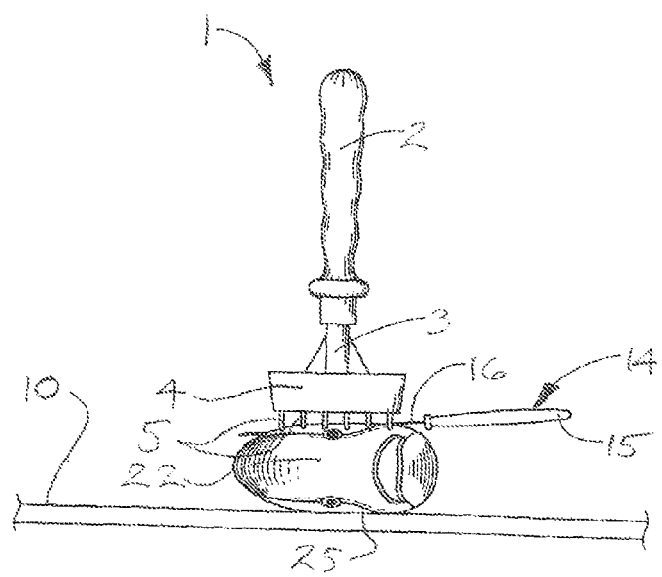
FIG. 6 is a front view of the fish as the fish is impaled on the fish cleaning surface and the fish cleaning knife is used to clean the fish.
Figure 7:
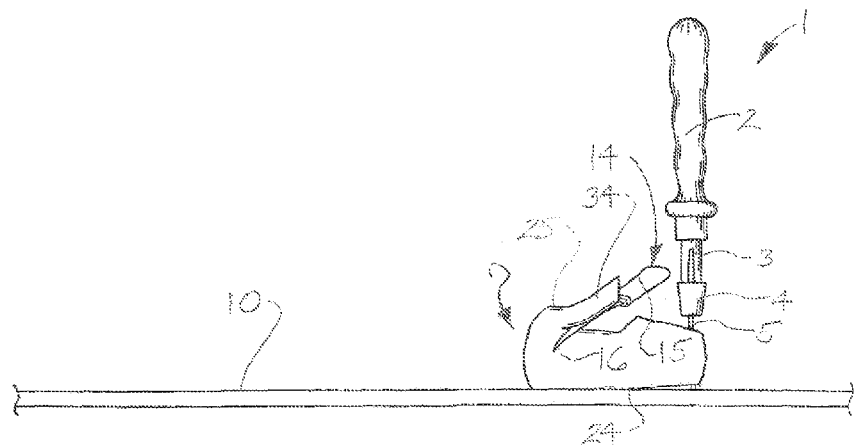
FIG. 7 is a side view of a portion of the cleaned fish, more particularly illustrating immobilization of the fish portion on the fish cleaning surface and removal of a filet from the fish portion.

As illustrated in FIG. 4, after the right side flesh strip 30 has been completely cut from the right side 25 of the fish 20, the fish 20 is turned over on its right side 25 to expose the left side 24 of the fish 20. Accordingly, the user lifts the pick 1 from the fish cleaning surface 10 and, as the pick tines 5 remain impaled through the fish head 22, manipulates the pick 1 to flip the fish 20 180 degrees from its left side 24 onto its right side 25, as illustrated in FIG. 5. As the right side 25 of the fish 20 is laid on the fish cleaning surface 10, the user may withdraw the pick tines 5 from the fish head 22 and then re-impale the pick tines 5 through the fish head 22 to again immobilize the fish 20 on the fish cleaning surface 10 on the right side 25 of the fish 20, as further illustrated in FIG. 5. While the user grips the pick handle 2 with one hand and maintains downward force of the pick tines 5 through the fish head 22 and against the fish cleaning surface 10, the user grips the knife handle 15 of the fish cleaning knife 14 with the other hand and cuts a left side flesh strip 30 from the left side 24 of the fish 20. The fish cleaning knife 14 may be moved, away from the fish head 22 toward the fish tail 23 to progressively cut the left side flesh strip 30 from the left side 24 of the fish 20, as illustrated in FIG. 5.

Since both the right side flesh strip 28 has been cut from the left side 24 and the left side flesh strip 30 has been cut from the right side 25 of the fish 20, the fish 20 may next be discarded. This may be accomplished by lifting the fish 20 from the fish cleaning surface 20 using the pick 1 as the pick tines 5 remain impaled in the fish head 22 and throwing the fish 20 into a suitable trash receptacle (not illustrated).

As illustrated in FIG. 8, in some embodiments of the method, at least one portion 20a of the fish 20 which remains after removal of the right side flesh strip 28 and the right side flesh strip 30 may be immobilized on the fish cleaning surface 10 using the pick 1, typically in the same manner as was heretofore described. The knife 14 may be used to cut one or more filets 34 from the right side 25 and/or the left side 24 of the fish portion 20a. The pick 1 may be used to flip the fish portion 20a from one side to the other preparatory to cutting the filet 34 from the upward-facing side of the fish portion 20a, as was heretofore described with respect to the fish 20.

When removal of the filets 34 from the fish portion 20a is completed, the pick 1 may be used to raise the fish portion 20a from the fish cleaning surface 10 and discard the fish portion 20a in a suitable trash receptacle.

After cleaning of the fish 20, additional fish 20 may be cleaned in a similar manner. The right side flesh strip 28, the left side flesh strip 30 and the filet or filets 34 may be baked, fried or otherwise cooked and consumed or may alternatively be frozen for later consumption.

It will be appreciated by those skilled in the art that the fish cleaning methods of the disclosure facilitate expeditious cleaning of fish without the necessity of soiling a user's hands. Accordingly, since the pick 1 maintains the fish 20 in an immobilized state on the fish cleaning surface 10 throughout cleaning, the hands of the use need not contact the fish 20 for the purpose. Moreover, the pick 1 immobilizes the fish 20 on the fish cleaning surface 10 even under circumstances in which the fish cleaning surface 10 becomes slick as a result of slime from the fish 20. This expedient facilitates expeditious and precise cutting of the right side flesh strip 28, the left side flesh strip 30 and the filets 34 from the fish 20 and the fish portion or portions 20a from successive fish 20.

Figure 9:
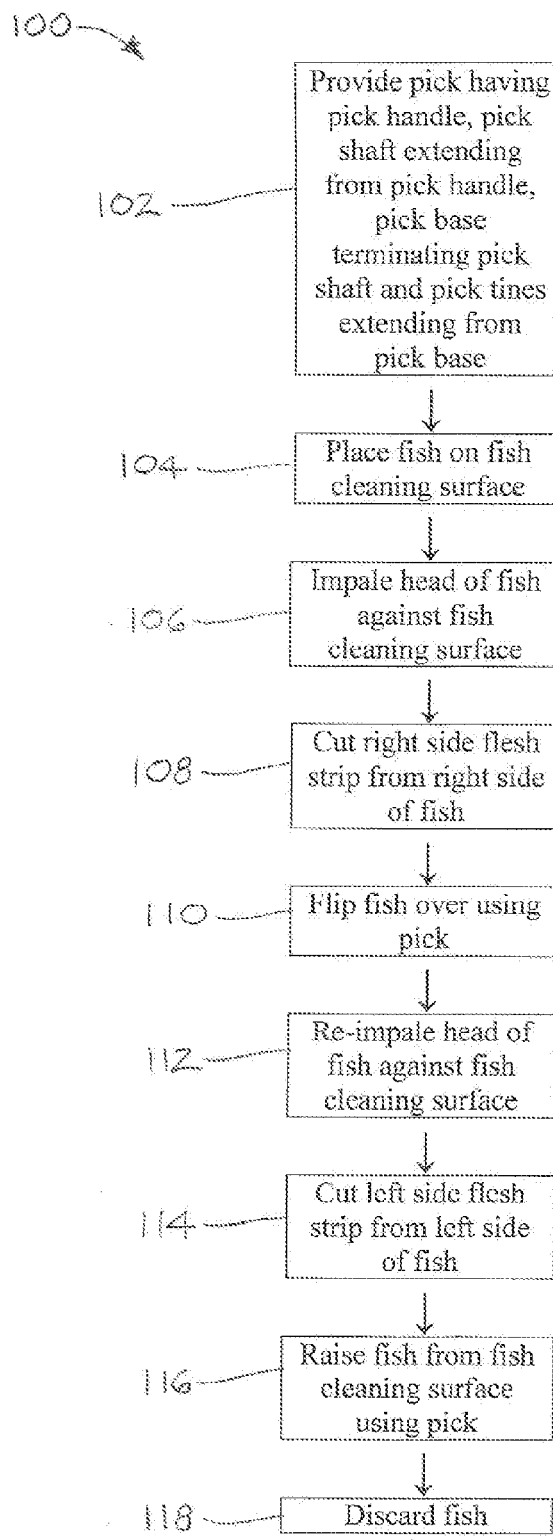
FIG. 9 is a flow diagram of an illustrative embodiment of the fish cleaning methods.

Referring next to FIG. 9, a flow diagram 100 of an illustrative embodiment of a fish cleaning method is illustrated, in block 102, a pick is provided. The pick may include a pick handle, a pick shaft extending from the pick handle, a pick base terminating the pick shaft and multiple pick tines extending from the pick base. In block 104, a fish is placed on a fish cleaning surface. In block 106, the head of the fish is impaled against the fish cleaning surface using a first hand of a user. In block 108, a knife is gripped by a second hand of the user and a right side flesh strip is cut from the right side of the fish. In block 110, the fish is flipped over using the pick. In block 112, the head of the fish is re-impaled against the fish cleaning surface. In block 114, a left side flesh strip is cut from the left side of the fish using the knife. In some embodiments, the left side flesh strip may be cut from the left side of the fish first, followed by flipping of the fish and cutting of the right side flesh strip from the right side of the fish. In subsequent steps, one or more filets may be cut from at least one fish portion which remains after cutting of the left side flesh strip and the right side flesh strip from the fish by impaling the fish portion against the fish cleaning surface using the pick, cutting the filet or filets from one side of the fish portion, flipping the fish portion over using the pick and cutting an additional filet or filets from the second side of the fish portion, in block 116, the fish is raised from the fish cleaning surface using the pick. In block 118, the fish may be discarded.

While illustrative embodiments of the disclosure have been described above, it will be recognized and understood that various modifications can be made and the appended claims are intended to cover all such modifications which may fall within the spirit and scope of the disclosure.

What is claimed is:

1. A fish cleaning method, comprising:
   providing a pick having a pick handle, a pick base carried by the pick handle and a plurality of spaced-apart, elongated pick tines extending from the pick base;
   placing a fish on a fish cleaning surface;
   grasping the pick handle of the pick with a first hand by wrapping the fingers of the first hand around the pick handle of the pick;
   immobilizing the fish on the fish cleaning surface by impaling the fish through the entire breadth of the fish with the pick tines of the pick;
   grasping a fish cleaning knife with a second hand;

cutting a flesh strip from the fish using the fish cleaning knife; and flipping the fish on the fish cleaning surface using the pick as the pick tines remain impaled through the fish after cutting the flesh strip from the fish such that flipping the fish is accomplished without grasping the fish with the fingers of the first hand or the fingers of the second hand.

2. The fish cleaning method of claim 1 further comprising cutting a second flesh strip from the fish using the fish cleaning knife.

3. The fish cleaning method of claim 1 wherein placing a fish on a fish cleaning surface comprises placing a fish on a left side on the fish cleaning surface and wherein cutting a flesh strip from the fish using the fish cleaning knife comprises cutting a right side flesh strip from a right side of the fish.

4. The fish cleaning method of claim 3 further comprising flipping the fish from the left side to the right side on the fish cleaning surface using the pick after cutting the right side flesh strip from the fish, impaling the fish with the pick tines of the pick and cutting a left side flesh strip from the left side of the fish.

5. The fish cleaning method of claim 1 wherein placing a fish on a fish cleaning surface comprises placing a fish on a right side on the fish cleaning surface and wherein cutting a flesh strip from the fish using the fish cleaning knife comprises cutting a left side flesh strip from a left side of the fish.

6. The fish cleaning method of claim 5 further comprising flipping the fish from the right side to the left side on the fish cleaning surface using the pick after cutting the left side flesh strip from the fish, impaling the fish with the pick tines of the pick and cutting a right side flesh strip from the right side of the fish.

7. The fish cleaning method of claim 1 wherein impaling the fish with the pick tines of the pick comprises impaling a head of the fish with the pick tines of the pick and cutting a flesh strip from the fish using the fish cleaning knife comprises culling a flesh strip from the fish from the head to a tail of the fish using the fish cleaning knife.

8. A fish cleaning method, comprising:
providing a pick having a generally elongated pick handle, a generally elongated pick base carried by and perpendicular to the pick handle and a plurality of spaced-apart, elongated pick tines extending from the pick base along a longitudinal axis of the pick base;
placing a fish on a fish cleaning surface;
grasping the pick handle of the pick with a first hand by wrapping the fingers of the first hand around the pick handle of the pick;
immobilizing the fish on the fish cleaning surface by impaling the fish through the entire breadth of the fish with the pick tines of the pick, the pick base of the pick oriented perpendicular to a longitudinal axis of the fish;
grasping a fish cleaning knife with a second hand;
cutting a flesh strip from the fish using the fish cleaning knife; and
flipping the fish on the fish cleaning surface using the pick as the pick tines remain impaled through the fish after cutting the flesh strip from the fish such that flipping the fish is accomplished without grasping the fish with the fingers of the first hand or the fingers of the second hand.

9. The fish cleaning method of claim 8 further comprising cutting a second flesh strip from the fish using the fish cleaning knife.

10. The fish cleaning method of claim 8 wherein placing a fish on a fish cleaning surface comprises placing a fish on a left side on the fish cleaning surface and wherein cutting a flesh strip from the fish using the fish cleaning knife comprises cutting a right side flesh strip from a right side of the fish.

11. The fish cleaning method of claim 10 further comprising flipping the fish from the left side to the right side on the fish cleaning surface using the pick after cutting the right side flesh strip from the fish, impaling the fish with the pick tines of the pick and cutting a left side flesh strip from the left side of the fish.

12. The fish cleaning method of claim 8 wherein placing a fish on a fish cleaning surface comprises placing a fish on a right side on the fish cleaning surface and wherein cutting a flesh strip from the fish using the fish cleaning knife comprises cutting a left side flesh strip from a left side of the fish.

13. The fish cleaning method of claim 12 further comprising flipping the fish from the right side to the left side on the fish cleaning surface using the pick after cutting the left side flesh strip from the fish, impaling the fish with the pick tines of the pick and cutting a right side flesh strip from the right side of the fish.

14. The fish cleaning method of claim 8 wherein impaling the fish with the pick tines of the pick comprises impaling a head of the fish with the pick tines of the pick and cutting a flesh strip from the fish using the fish cleaning knife comprises cutting a flesh strip from the fish from the head to a tail of the fish using the fish cleaning knife.

15. A fish cleaning method, comprising:
providing a pick having a generally elongated pick handle, a generally elongated pick base carried by and perpendicular to the pick handle and a plurality of spaced-apart, elongated pick tines extending from the pick base along a longitudinal axis of the pick base;
placing a fish on a first side on a fish cleaning surface;
grasping the pick handle of the pick with a first hand by wrapping the fingers of the first hand around the pick handle of the pick;
immobilizing the fish on the fish cleaning surface by impaling the fish through the entire breadth of the fish with the pick tines of the pick, the pick base of the pick oriented perpendicular to a longitudinal axis of the fish;
grasping a fish cleaning knife with a second hand;
cutting a first side flesh strip from the fish using the fish cleaning knife;
flipping the fish from the first side to the second side on the fish cleaning surface using the pick as the pick tines remain impaled through the fish after cutting the flesh strip from the fish such that flipping the fish is accomplished without grasping the fish with the fingers of the first hand or the fingers of the second hand; and
cutting a second side flesh strip from the second side of the fish using the fish cleaning knife.

16. The fish cleaning method of claim 15 wherein impaling the fish with the pick tines of the pick comprises impaling a head of the fish with the pick tines of the pick.

17. The fish cleaning method of claim 16 wherein cutting a flesh strip from the fish using the fish cleaning knife comprises cutting a flesh strip from the fish from the head to a tail of the fish using the fish cleaning knife.

18. The fish cleaning method of claim 15 further comprising cutting the fish into at least one fish portion, immobilizing the fish portion on the fish cleaning surface by impaling the fish portion with the pick tines of the pick, cutting a filet from a first side of the fish portion using the fish cleaning knife, flipping the fish portion, immobilizing the fish portion on the fish cleaning surface by impaling the fish portion with the pick tines of the pick and cutting a second filet from a second side of the fish portion.

* * * * *